July 7, 1936.  E. P. GILLETTE  2,047,064

METHOD AND APPARATUS FOR BURNING LIME STONE AND RECOVERING CARBON DIOXIDE

Filed April 3, 1933  4 Sheets-Sheet 1

Inventor
Edward P. Gillette
By
Parker & Parker
Attorneys

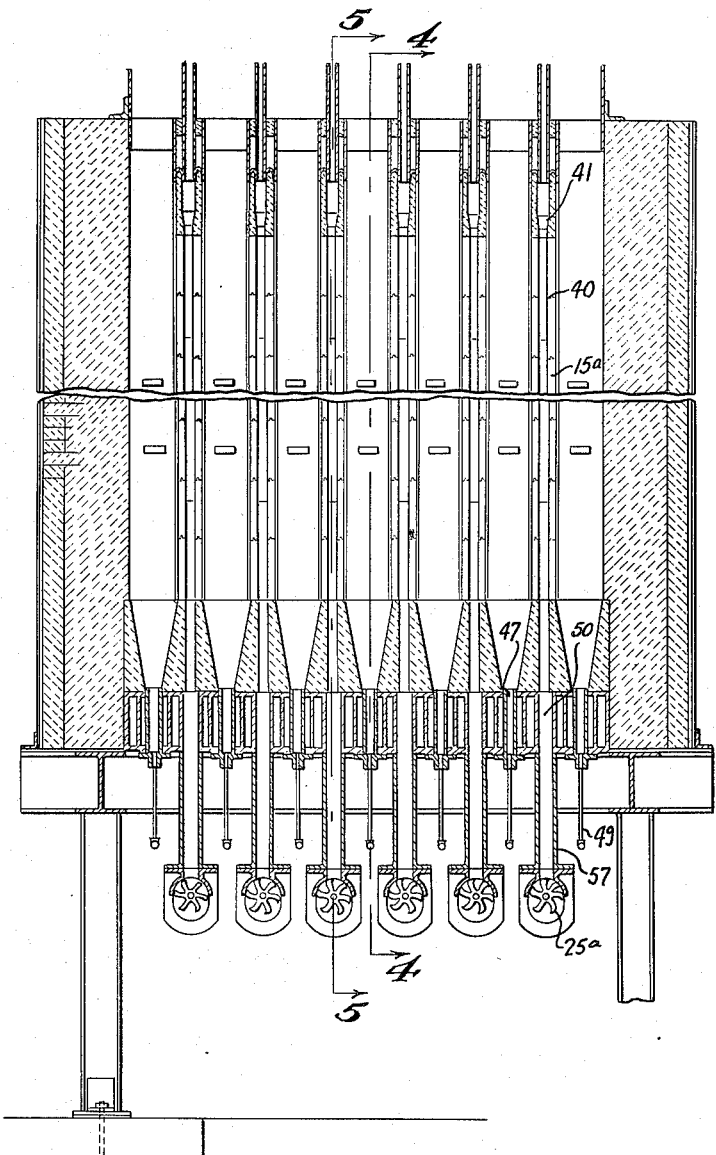

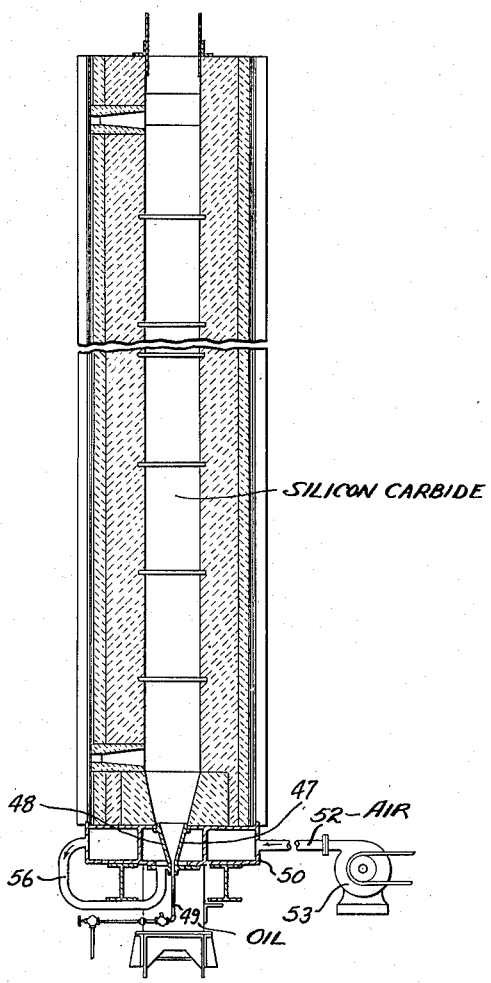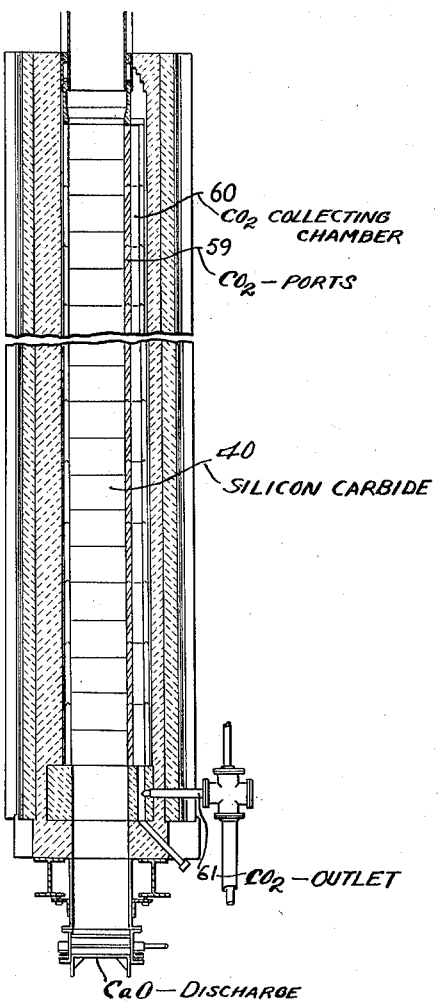

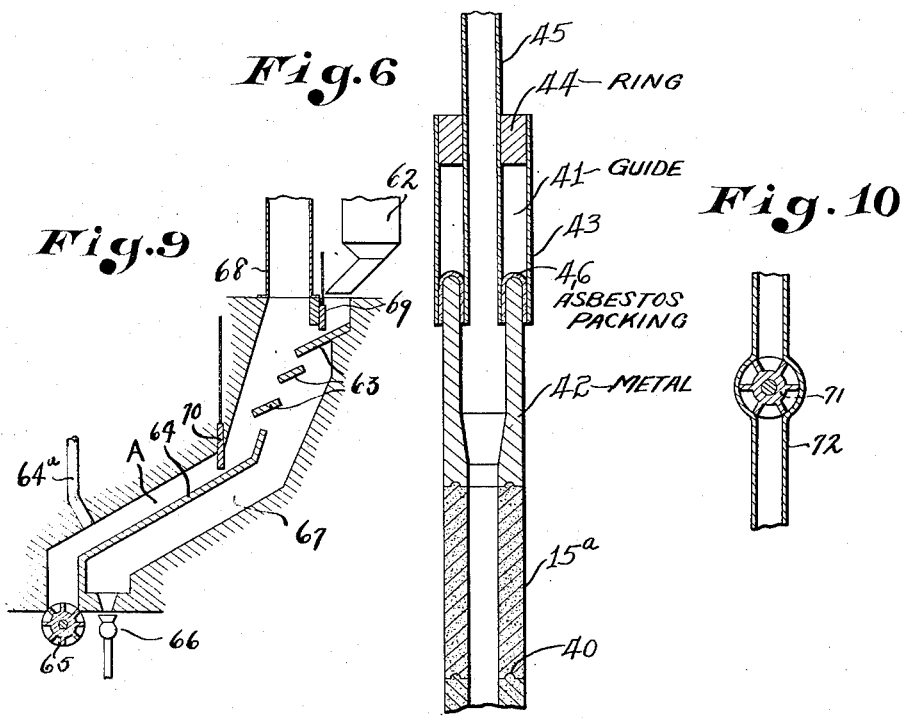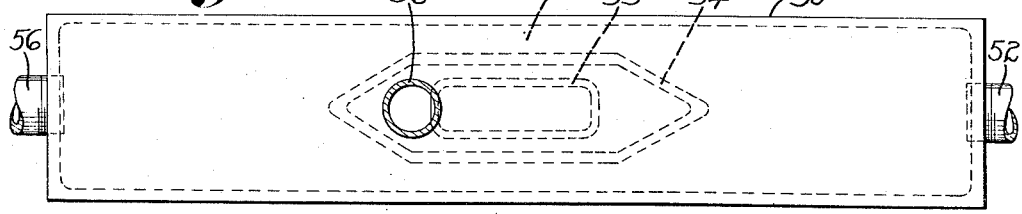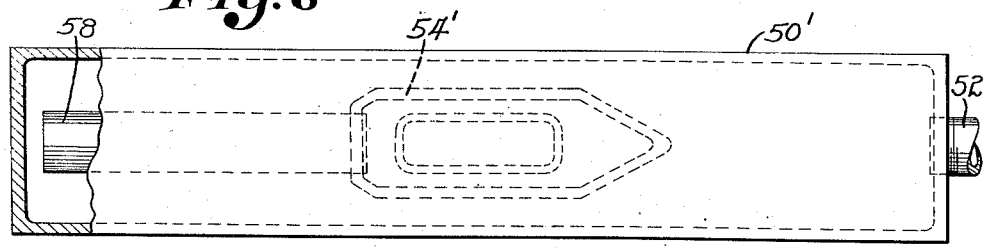

Patented July 7, 1936

2,047,064

UNITED STATES PATENT OFFICE 2,047,064

METHOD AND APPARATUS FOR BURNING LIMESTONE AND RECOVERING CARBON DIOXIDE

Edward P. Gillette, Toledo, Ohio, assignor to Gillette Research Corporation, Toledo, Ohio, a corporation of Ohio Application April 3, 1933, Serial No. 664,160

5 Claims. (Cl. 263—53)

This invention relates to the burning of lime stone, or similar materials, which, upon being heated to a sufficiently high temperature, give off carbon dioxide, and an object is to produce a simple, practical and efficient method of burning lime stone and recovering the carbon dioxide therefrom by which burning and gas-recovery may, if desired, be continuous, the lime being progressed in a stream through a chamber and during such travel burning is accomplished and carbon dioxide drawn off in substantially a pure state.

Another object is to produce a new and improved apparatus for burning a carbon dioxide containing material, such as lime stone, and collecting or recovering the carbon dioxide, which is dissociated from the lime stone.

Other objects and advantages of the invention reside in details of construction, arrangement and operation, which will hereinafter appear, and, for purposes of illustration, but not of limitation, embodiments of the invention are shown in the accompanying drawings, in which:

Figure 3 is a vertical sectional elevation of an alternate form of kiln;

Figure 4 is a vertical sectional elevation on the line 4—4 of Figure 3 taken through a combustion chamber;

Figure 5 is a vertical sectional elevation on the line 5—5 of Figure 3 taken through a muffle chamber;

Figure 6 is an enlarged sectional view of an expansion joint for the upper ends of the retorts shown in Figure 3;

Figure 7 is a bottom plan view of a pre-heater shown in Figures 3, 4, and 5;

Figure 8 is a bottom plan view of an alternate form of pre-heater;

Figure 9 is a diagrammatic view of another form of apparatus corresponding to that shown in my Patent No. 1,923,084; and Figure 10 is a vertical sectional elevation of a valve seal for the upper end of the retorts.

Figure 1:
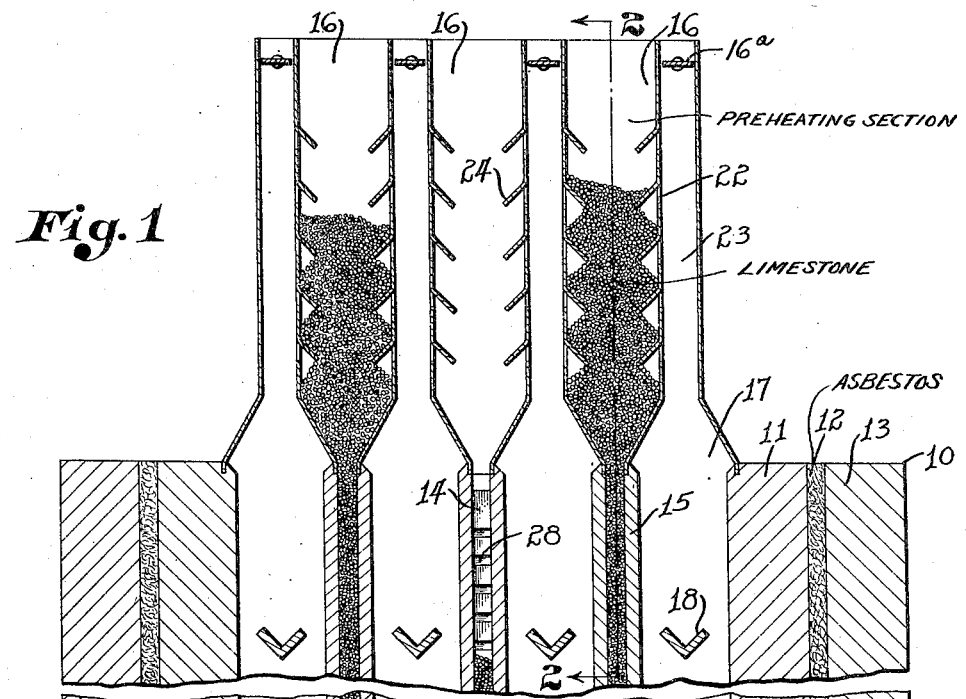
Figure 1 is a vertical sectional element of a kiln.
Figure 2:
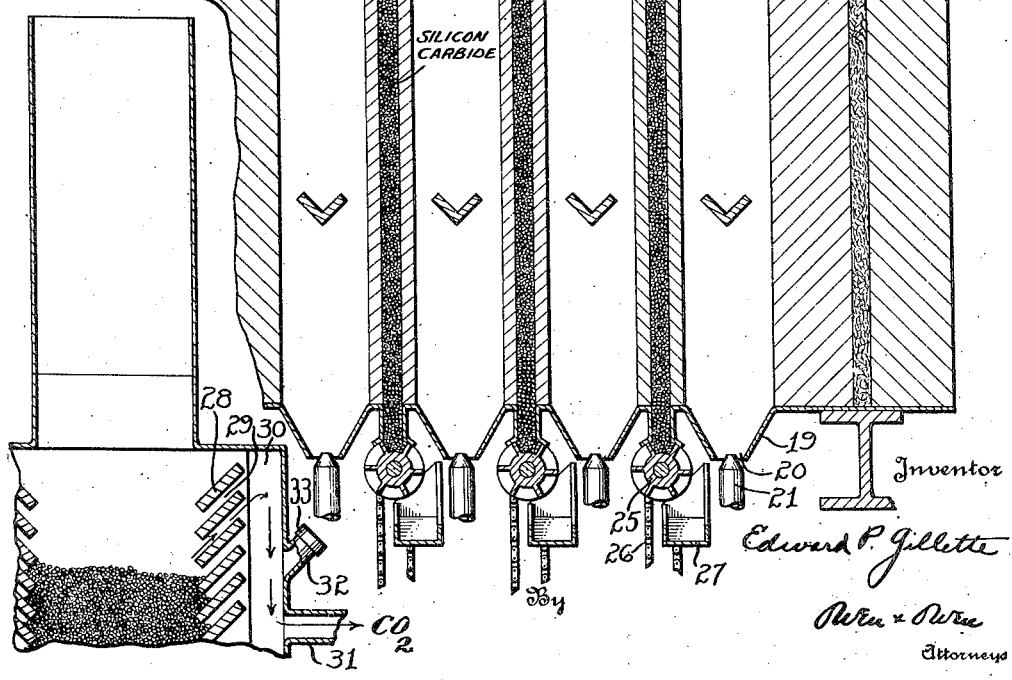
Figure 2 is an enlarged sectional view of a portion of the kiln showing the manner in which carbon dioxide is withdrawn from the muffle or reaction chambers.

The illustrated embodiment of the invention shown in Figures 1 and 2, comprises a lime-burning kiln having an outer wall 10, which preferably consists of an inner layer 11 of fire brick, an intermediate layer 12 of dry asbestos, and an outer layer 13 of common brick. Disposed within the outer wall 10 are a plurality of muffle, reaction or lime-burning chambers 14, which are substantially co-extensive with the outer wall. In this instance three reaction chambers are shown, but this number may be increased or diminished in accordance with the demand.

The walls 15 of the reaction chambers 14 are preferably of a material which is highly heat-conductive, but capable of withstanding enormously high temperatures necessary for the proper burning of lime stone. This material also is of such nature that lime stone, upon being burned, will not adhere to it. The ordinary refractory materials used in lime kilns are not suitable for this purpose for one reason or another, but it has been found that silicon carbide, or carborundum, as it is ordinarily referred to, is admirably adapted for the purpose. This material readily conducts heat, and is capable of withstanding the high temperatures necessary for this purpose. Furthermore, the granular lime stone flows over a surface of silicon carbide freely without objectionable fusing or caking.

Lime stone in granular form is delivered to hoppers 16 disposed respectively above the reaction chambers 14. Preferably, the hoppers 16 are wider than the reaction chambers 14, and the granular lime stone provides a substantially gas tight seal at the entrance of each reaction chamber. The walls of the hoppers 16 may be of sheet metal since they are remote from the furnaces and the heat is not so intense. As will hereinafter appear, the more intensely heated gases are applied to the walls of the reaction chamber, and the heat is largely dissipated by the time the gases reach the hoppers 16.

Between the reaction chambers 14 are flues 17 in which are disposed baffles 18 inclined to deflect the heat toward the walls of the adjacent reaction chambers. At the lower end of the flues 17 are metallic cones 19 having openings 20 to receive burners 21. Oil burning furnaces have been found satisfactory for this purpose, and any suitable burner may be employed. It is manifest that the heated gases from the burners 21 pass upwardly through the flues 17 and impinge upon opposite walls 15 of the reaction chambers 14 imparting sufficient heat to the lime stone therein to effect the desired burning.

In order to pre-heat the lime stone before it enters the reaction chambers 14, the sides of the hoppers 16 are provided with a plurality of perforations 22 so that the heated gases from the flues 17 passing through supplemental flues 23 adjacent the hoppers, may enter the hoppers 16. Dampers 16ª are provided in the flues 23 for regulating the flow of fuel gases into the hoppers. Within the hoppers 16 and adjacent each of the perforations 22 is a downwardly inclined baffle 24 to afford a substantially free and unobstructed passage of the gases into the hoppers. This arrangement is important since the lime stone entering the reaction chamber is pre-heated, and burns readily with a less amount of heat so that a material saving in furnace cost is effected. Furthermore, any water or dampness is driven off before the lime stone reaches the muffle chamber, as well as those gases which dissociate at temperatures lower than that at which carbon dioxide dissociates. This is especially desirable when the material treated includes various contaminating impurities with the limestone.

A seal of lime stone is provided at the lower end of each of the reaction chambers 14, and, conveniently, a pocketed wheel 25 is disposed adjacent each outlet of the reaction chambers 14. The wheels 25 are rotated in any suitable manner, as by a sprocket and chain connection 26, and the burned lime, or calcium oxide, is mechanically discharged into a suitable receptacle or chute 27, from which it may be conveyed in any suitable manner.

An important feature of this kiln resides in withdrawing the products of dissociation from the reaction chambers 14, thereby enabling practically complete recovery of the carbon dioxide evolved in the burning of lime stone. For this purpose the opposite side walls, for example the front and rear, of each reaction chamber 14 are provided with a series of downwardly and inwardly inclined plates 28, which are spaced apart to provide outlet passages 29, through which the carbon dioxide may pass into a collecting chamber 30, the walls of which may be sheet metal disposed on the outside of the kiln. From the collecting chamber 30 extends a conduit 31, which may lead to a compressor or a suction device for drawing off the gas either to store the same or to compress and solidify it. An observation orifice 32 closed by a cap 33 may also be provided for the collecting chamber 30. The number of orifices 29 may be varied as desired. They may extend the entire length of the chamber, or may be arranged at intervals.

From the above description it is apparent that opposite ends of the reaction chambers are sealed by the lime stone so that the escape of carbon dioxide from the burning of the lime stone is substantially prevented. Thus, almost complete recovery of the carbon dioxide may be obtained in an extremely simple and convenient manner. The kiln is not only able efficiently to burn the granular lime stone which cannot be burned in the ordinary lime kiln, and which is usually thrown away or disposed of at a very low price, but also enables recovery of the carbon dioxide, which has a wide range of use for beverage purposes, for what is commonly termed "dry ice", and for numerous other uses. The recovered carbon dioxide is quite free from impurities, because contaminating gases from most of the impurities in the limestone are driven off during the pre-heating.

In the form of the apparatus shown in Figures 3 to 5, a series of six retorts is shown, which are of similar construction, with certain modifications and changes hereinafter described. As shown, the walls of each retort are made up of a plurality of silicon carbide sections 15a having tongue and groove connections 40. When the walls are heated to a temperature sufficiently high to effect dissociation of carbon dioxide from the lime stone, the silicon carbide walls expand to some extent vertically. This expansion is compensated for by an expansion joint 41, which is shown in detail in Figure 6.

A cast metal tube 42 rests on the upper end of the walls of each retort, and the upper end of this tube extends into a guide 43, the upper end of which is closed by a ring 44. Extending through the ring is a tube 45, which leads from the hopper into which the lime stone is introduced. The lower end of the tube 45 is substantially flush with the lower end of the guide 43, and the space between the tube 45 and guide 43 is sufficient to accommodate the upper end portion of the tubular member 42. Wrapped around the upper end portion of the tube 42 is a packing 46 of asbestos, or similar material, to effect a fairly tight connection between these parts. It will be seen that when the walls of the retorts are heated so that they expand longitudinally, the tube 42 will be moved upwardly into the guide 43, sufficient space being provided for this movement, and the packing 46 will maintain the desired seal between these parts.

In both forms shown in Figures 1 and 3, the walls of the retorts provide a passage, the dimensions of which are of the order of ten inches in breadth and two inches in width, the height being approximately twenty feet. This construction enables the lime stone to pass through the retorts in a continuous stream, and the various particles at one time or another to be brought in contact with at least one of the silicon carbide walls, thereby to insure satisfactory burning and complete dissociation of the carbon dioxide. Since the heat is applied across both broad sides of the stream, an even and sufficient application of heat is obtained, and even when the material is of such a nature that gases pass slowly therethrough, the released carbon dioxide finds sufficient outlet through the successive apertures spaced along a narrow side or sides of the chute.

It will further be noted in both forms that the upright retorts are spaced laterally from each other, and particularly in Figure 4 a burner nozzle 47 is disposed between each pair of retorts. The burner 47 is of frusto conical form, and is provided with a series of louvres 48 in the walls thereof to admit air. Detailed description of the operation of the burner is not considered necessary. Suffice it to say that oil, or other suitable fuel, is delivered to the lower end of the burner through a pipe line 49.

Each burner 47 is mounted in a casting 50, which is shown in detail on Figure 7, and comprises a box-like structure 51, to one end of which leads a pipe 52 through which air is blown by a blower 53. A partition 54 separates the central portion of the casting from the remainder. Within the partition walls 54 is an opening 55, in which the burner nozzle 47 is mounted.

The air introduced into the pre-heater from the pipe 52, passes the full length of the pre-heater to a discharge pipe 56, which leads to the underside of the pre-heater in the region of the burner nozzle 47. It will be understood that the air passing through the casting 51 is heated so that the air supplied to the burner nozzle is at the desired temperature for combustion purposes. As shown in Fig. 3, the side walls of the pre-heater 50 serve as a guide for the lime passing from the muffle chambers, and since this lime is at a relatively high temperature, the casting 51 will be accordingly heated. Another advantage of this arrangement is that the air being blown into the casting 51 tends to cool the side walls thereof, and consequently discharging lime so that the temperature of the latter is materially reduced. It will further be seen that the pre-heaters form the base structure for the retorts.

In order further to cool the lime before it is finally discharged, tubes 57 lead downwardly from the pre-heaters to the rotating discharge valves 25ª.

In the alternate form shown in Figure 8, one end of the partition wall 54' is squared, and a hole is tapped to receive a pipe 58, which terminates short of the adjacent outer wall of the casting 50'. This provides a sufficiently tortuous path for the air for adequately heating it before passing through the pipe 58 to the burner nozzle.

Figure 5 shows the construction which enables the withdrawal of the carbon dioxide from the reaction chamber. It will be noted that the sections providing one wall of the muffle, or reaction chamber, are formed with a series of upwardly inclined openings or ports 59. These ports are arranged in succession from the upper end of the chamber to the lower end and lead to a collecting chamber 60. The carbon dioxide settling in this chamber is withdrawn through a discharge pipe 61. Preferably, a pump is employed to withdraw the carbon dioxide from the chamber 60. It is found desirable to pump or withdraw the gas from the chamber 60 fast enough to create a slight suction in the region of the openings 59.

The apparatus shown in Figure 9 corresponds to that shown in my earlier application Serial No. 493,520. In this form the lime stone is introduced into a hopper 62, from which it drops by gravity over the plates 63 arranged in stepped formation, and thence on to an elongate downwardly inclined wall 64. From the wall 64, providing the bottom wall of a reaction chamber A, the material is discharged by a rotary valve 65. The plates 63 and wall 64 are of silicon carbide, and heat is furnished by a burner 66 disposed beneath the wall 64. The heated gases travel upwardly through the passage 67 to the stack 68, and thus pre-heat the material on the plates 63 before it reaches the wall 64. In the passage of the lime stone from the hopper to the wall 64, the gases which dissociate at a temperature lower than carbon dioxide, will be driven off. The silicon carbide wall 64 is heated to a sufficiently high temperature to effect dissociation of the carbon dioxide from the lime stone, which is withdrawn through a duct 64ª. A gate 69 controls the passage of lime stone over the plate 63, and another gate 70 controls the stream of lime stone flowing by gravity over the wall 64. Some lime stone in rear of the gate 70 cooperates to seal the reaction chamber A, but under some conditions the gate 70 may provide a valve seal for one end of the reaction chamber A, the opposite end of the chamber being sealed by the valve 65 or by a quantity of material directly thereabove, as the case may be.

If desired, the upper end of each retort, such as shown in Figure 3, may be closed by a valve seal. Such a seal is shown in Figure 10, in which a rotary pocketed valve 71 is disposed within a tubular casing 72, which may communicate at its opposite ends respectively with a retort and the supplying hopper. The valve 71 is so mounted as to seal one end of the reaction chamber, and this may be utilized in place of or in conjunction with the lime stone seal, as above described. The valve 71 may be rotated at any desired rate of speed, either continuously or intermittently, as desired, or may be synchronized with the rotary discharge valve above described.

Numerous changes in details of construction, arrangement and choice of materials may be effected without departing from the spirit of the invention, especially as defined by the appended claims. I do not intend the word "limestone" as used herein to be restricted solely to rock formation, but it shall broadly apply to any material or substance mainly composed of calcium and/or magnesium carbonate, such for example as oyster shells.

What I claim as new and desire to secure by Letters Patent is:

1. The method of burning calcium carbonate and recovering substantially pure carbon dioxide therefrom, which consists in preheating raw materials containing calcium carbonate to a purifying temperature nearly sufficient to effect the dissociation of carbon dioxide from the calcium carbonate, permitting the escape of any vapor or gases liberated by such heating, introducing the purified material into a muffle chamber having an inlet and an outlet for the material, heating the material in said chamber sufficiently to effect the dissociation of carbon dioxide therefrom, withdrawing the carbon dioxide from the chamber, repeatedly introducing additional amounts of purified material into the chamber and withdrawing carbon dioxide and burned material therefrom, and continuously guarding against the entrance of any substantial amount of gas, other than carbon dioxide, through either the inlet or outlet opening, and thereby providing a continuous supply of substantially pure carbon dioxide from said chamber.

2. The method of burning lime stone which comprises progressing lime stone in a thin broad stream between and in contact with the opposed walls of a muffle chamber having an inlet and an outlet opening, substantially sealing the inlet opening, heating said walls to a sufficiently high temperature to effect dissociation of carbon dioxide from the lime stone, and withdrawing the carbon dioxide from points adjacent the edge of the lime stone stream reached successively in the travel of the limestone to the outlet opening.

3. The method of burning limestone which comprises introducing the limestone into a tubular muffle chamber having an inlet and an outlet opening, substantially sealing the inlet opening, progressing the limestone through the chamber in a stream substantially filling the chamber during the burning and in contact with the walls thereof, heating said walls to a temperature high enough to cause dissociation of carbon dioxide, and withdrawing the carbon dioxide from points adjacent the path of the limestone reached successively in the travel of the limestone to the outlet opening.

4. The method of recovering carbon dioxide from carbonates which comprises moving the carbonate in a stream elongate in cross section and in contact on its broad sides with walls heated to a temperature sufficient to cause the release of carbon dioxide from the carbonate in contact therewith and of a material to which the carbonate does not adhere at said temperature, and withdrawing the dissociated carbon dioxide from its narrow side.

5. Apparatus of the kind described comprising a vertically arranged tube elongate in cross section and having its interior unobstructed and its broader sides of imperforate sheets of silicon carbide, means to heat said broader sides, means forming a passageway along a narrower side, openings through said narrower side from the tube into the passageway, and means to withdraw gas from said passageway.

EDWARD P. GILLETTE.